United States Patent
Freedman et al.

(10) Patent No.: US 9,542,749 B2
(45) Date of Patent: Jan. 10, 2017

(54) FAST GENERAL MULTIPATH CORRECTION IN TIME-OF-FLIGHT IMAGING

(71) Applicant: MICROSOFT TECHNOLOGY LICENSING, LLC, Redmond, WA (US)

(72) Inventors: Daniel Freedman, Zikhron Ya'aqov (IL); Eyal Krupka, Shimshit (IL); Yoni Smolin, Haifa (IL); Ido Leichter, Haifa (IL); Mirko Schmidt, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 74 days.

(21) Appl. No.: 14/148,184

(22) Filed: Jan. 6, 2014

(65) Prior Publication Data
US 2015/0193938 A1 Jul. 9, 2015

(51) Int. Cl.
| | |
|---|---|
| *G06K 9/00* | (2006.01) |
| *G06T 7/00* | (2006.01) |
| *H04N 13/00* | (2006.01) |
| *H04N 13/02* | (2006.01) |
| *G01S 17/36* | (2006.01) |

(Continued)

(52) U.S. Cl.
CPC ............. *G06T 7/0061* (2013.01); *G01S 7/497* (2013.01); *G01S 17/36* (2013.01); *G01S 17/89* (2013.01); *G06T 7/0075* (2013.01); *H04N 13/0022* (2013.01); *H04N 13/0271* (2013.01); *G06T 2207/10028* (2013.01); *G06T 2207/20076* (2013.01)

(58) Field of Classification Search
None
See application file for complete search history.

(56) References Cited

U.S. PATENT DOCUMENTS

| | | | |
|---|---|---|---|
| 5,930,383 A | 7/1999 | Netzer | |
| 6,445,491 B2 * | 9/2002 | Sucha | ............................ 359/326 |

(Continued)

FOREIGN PATENT DOCUMENTS

WO      2013121267 A1     8/2013

OTHER PUBLICATIONS

"International Search Report & Written Opinion for PCT Application No. PCT/US2014/069868", Mailed Date: Apr. 7, 2015, 11 Pages.

(Continued)

*Primary Examiner* — Jayesh A Patel
(74) *Attorney, Agent, or Firm* — Tom Wong; Micky Minhas

(57) ABSTRACT

Fast general multipath correction in time of flight imaging is described, for example, to obtain accurate depth maps at frame rate from a time of flight camera. In various embodiments accurate depth maps are calculated by looking up corrected depth values stored in a look up table. In various embodiments the corrected depth values are highly accurate as they take into account three or more possible light ray paths between the camera and a surface in a scene being imaged. In an example accurate depth maps are computed at a frame rate of a time of flight camera. In an example accurate depth maps are computed in less than 30 milliseconds for an image having over 200,000 pixels using a standard CPU.

19 Claims, 8 Drawing Sheets

(51) Int. Cl.
G01S 17/89 (2006.01)
G01S 7/497 (2006.01)

(56) References Cited

U.S. PATENT DOCUMENTS

| | | | |
|---|---|---|---|
| 7,312,879 B2 | 12/2007 | Johnston | |
| 8,339,582 B2 | 12/2012 | Shim et al. | |
| 2009/0322745 A1* | 12/2009 | Zhang | G06T 7/0057 345/420 |
| 2011/0176709 A1 | 7/2011 | Park et al. | |
| 2011/0310376 A1 | 12/2011 | Shim et al. | |
| 2012/0033045 A1 | 2/2012 | Schweizer et al. | |
| 2012/0081360 A1* | 4/2012 | Uehira | G01B 11/2545 345/419 |
| 2013/0026384 A1* | 1/2013 | Kim | G01S 17/89 250/393 |
| 2013/0050426 A1 | 2/2013 | Sarmast et al. | |
| 2013/0093852 A1* | 4/2013 | Ye | A61H 3/061 348/46 |
| 2013/0116977 A1* | 5/2013 | Godbaz | G01S 17/89 702/189 |
| 2014/0368613 A1* | 12/2014 | Krupka | 348/46 |

OTHER PUBLICATIONS

Fuchs, Stefan, "Multipath Interference Compensation in Time-of-Flight Camera Images", In IEEE International Conference on Pattern Recognition, Aug. 23, 2010, 4 pages.

Jimenez, et al., "Modelling and Correction of Multipath Interference in Time of Flight Cameras", In IEEE Conference on Computer Vision and Pattern Recognition, Jun. 16, 2012, 8 pages.

Dorrington et al., "Separating True Range Measurements from Multi-Path and Scattering Interference in Commercial Range Cameras", In Proceedings of Three-Dimensional Imaging, Interaction, and Measurement, Jan. 27, 2011, 10 Pages.

Candes, et al., "Decoding by Linear Programming", In IEEE Transactions on Information Theory, vol. 51, Issue 12, Dec. 2012, 13 pages.

Candes, et al., "Stable Signal Recovery from Incomplete and Inaccurate Measurements", In Communications on Pure and Applied Mathematics, vol. 59, Issue 8, Mar. 1, 2006, 17 pages.

Donoho, David L, "Compressed Sensing", In IEEE Transactions on Information Theory, vol. 52, Issue 4, Apr. 2006, 18 pages.

Daubechies, et al., "Iteratively Reweighted Least Squares Minimization for Sparse Recovery", in Communications on Pure and Applied Mathematics, vol. 63, Issue 1, Oct. 19, 2009, 38 pages.

Baraniuk, Richard G, "Compressive Sensing [Lecture Notes]", In IEEE Signal Processing Magazine, vol. 24, Issue 4, Jul. 2007, 4 pages.

Candes, et al., "An Introduction to Compressive Sampling", In IEEE Signal Processing Magazine, vol. 25, Issue 2, Mar. 2008, 10 pages.

Candes, Emmanuel J, "Compressive Sampling", In Proceedings of the International Congress of Mathematicians: Madrid, Aug. 22, 2006, 20 pages.

U.S. Appl. No. 13/917,974, Krupka,Eyal, "Depth Map Correction using Lookup Tables", filed Jun. 14, 2013.

D. Falie and V. Buzuloiu. Further investigations on ToF cameras distance errors and their corrections. In European Conference on Circuits and Systems for Communications (ECCSC), pp. 197-200, 2008.

S. Fuchs, M. Suppa, and O. Hellwich. Compensation for multipath in ToF camera measurements supported by photometric calibration and environment integration. In Computer Vision Systems, pp. 31-41, 2013.

J. Han, L. Shao, D. Xu, and J. Shotton. Enhanced computer vision with Microsoft Kinect sensor: A review. IEEE Transactions on Cybernetics, 43(5): 1318-1334, 2013.

A. Kirmani, A. Benedetti, and P.A. Chou. Spumic: Simultaneous phase un-wrapping and multipath interference cancellation in time-of-flight cameras using spectral methods. In IEEE International Conference on Multimedia and Expo (ICME), pp. 1-6, 2013.

S.G. Mallat and Z. Zhang. Matching pursuits with time-frequency dictionaries. IEEE Transactions on Signal Processing, 41(12):3397-3415, 1993.

J. Wright, A. Y. Yang, A. Ganesh, S.S. Sastry, and Y. Ma. Robust face recognition via sparse representation. IEEE Transactions on Pattern Analysis and Machine Intelligence, 31(2):210-227, 2009.

IPEA European Patent Office, Second Written Opinion Issued in Application No. PCT/US2014/069868, Nov. 30, 2015, WIPO, 7 pages.

IPEA European Patent Office, International Preliminary Report on Patentability issued in Application No. PCT/US2014/069868, Mar. 15, 2016, WIPO, 8 pages.

* cited by examiner

FAST GENERAL MULTIPATH CORRECTION IN TIME-OF-FLIGHT IMAGING

BACKGROUND

Time of flight imaging is a type of depth sensing technology used in many computer vision applications such as object tracking and recognition, human activity analysis, hand gesture analysis, and indoor 3D mapping, amongst others.

A time of flight system comprises one or more light sources which emit rays of light into a scene, and a light sensor such as a camera. A time of flight system works by computing the time, measured as a phase shift, it takes a ray of emitted light to bounce off a surface and return to a camera at the system. This gives a measurement of the depth of the surface from the camera. Time of flight systems are generally able to achieve reasonable accuracy, and, where they use light in the infrared spectrum, to operate in low illumination settings.

However, time of flight systems suffer from multipath interference (henceforth simply "multipath"). Where the emitted rays of light are sent out for each pixel, and since light can reflect off surfaces in myriad ways, a particular pixel may receive photons originally sent out for other pixels as well. This results in corrupted sensor measurements. These corruptions do not look like ordinary noise, and can be quite large, resulting in highly inaccurate depth estimates. For example, significant multipath is observed in scenes with shiny or specular-like floors.

Removing the effect of multipath is therefore a crucial component to enable accurate time of flight systems. Attempts to remove the effect of multipath have involved using additional sensors. Other approaches have used radiometric models; or radiometric and photometric models. There is an ongoing need to improve the accuracy of time of flight systems by improving multipath removal. However, for many practical applications such as object tracking, hand gesture recognition and others, the time of flight system needs to be both accurate and fast so that accurate depth measurements are output in real time, for example, at a frame rate of a camera capturing a stream of images of the scene.

The embodiments described below are not limited to implementations which solve any or all of the disadvantages of known time of flight depth measurement correction systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Fast general multipath correction in time of flight imaging is described, for example, to obtain accurate depth maps at frame rate from a time of flight camera. In various embodiments accurate depth maps are calculated by looking up corrected depth values stored in a look up table. In various embodiments the corrected depth values are highly accurate as they take into account three or more possible light ray paths between the camera and a surface in a scene being imaged. In an example accurate depth maps are computed at a frame rate of a time of flight camera. In an example accurate depth maps are computed in less than 30 milliseconds for an image having over 200,000 pixels using a standard CPU.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Various examples in this document describe a time of flight system used indoors in an environment such as a living room with a shiny, specular floor. However, this is not essential. The time of flight system described herein may be used in other environments including outdoor environments.

Phase modulation time of flight depth cameras can generate depth maps in near real time and are therefore suitable for tracking movements of humans, for example, gestures used for interacting with electronic devices, e.g. game consoles, televisions and other electronic devices. In other embodiments phase modulation time of flight depth cameras may be used for range measurement, automotive applications e.g. parking sensors and collision avoidance systems and other applications where accurate distances to objects are measured. The terms "camera" and "depth camera" are used herein interchangeably with "phase modulation time of flight camera". A depth map is an image where each pixel comprises a depth value indicating a distance from the camera to a surface in a scene depicted in the image. As mentioned in the background section, multipath interference leads to significant errors in depth maps from time of flight systems. It is recognized herein that previous approaches to multi-path correction have all assumed that multi-path interference is made up of exactly two paths. The examples described herein correct for multi-path interference which is made up of three or more paths and this means that the examples described herein achieve greater accuracy of depth value output than previously possible. In addition, various examples in which multi-path correction taking into account three or more paths is achieved at camera frame rates are described.

Figure 1:
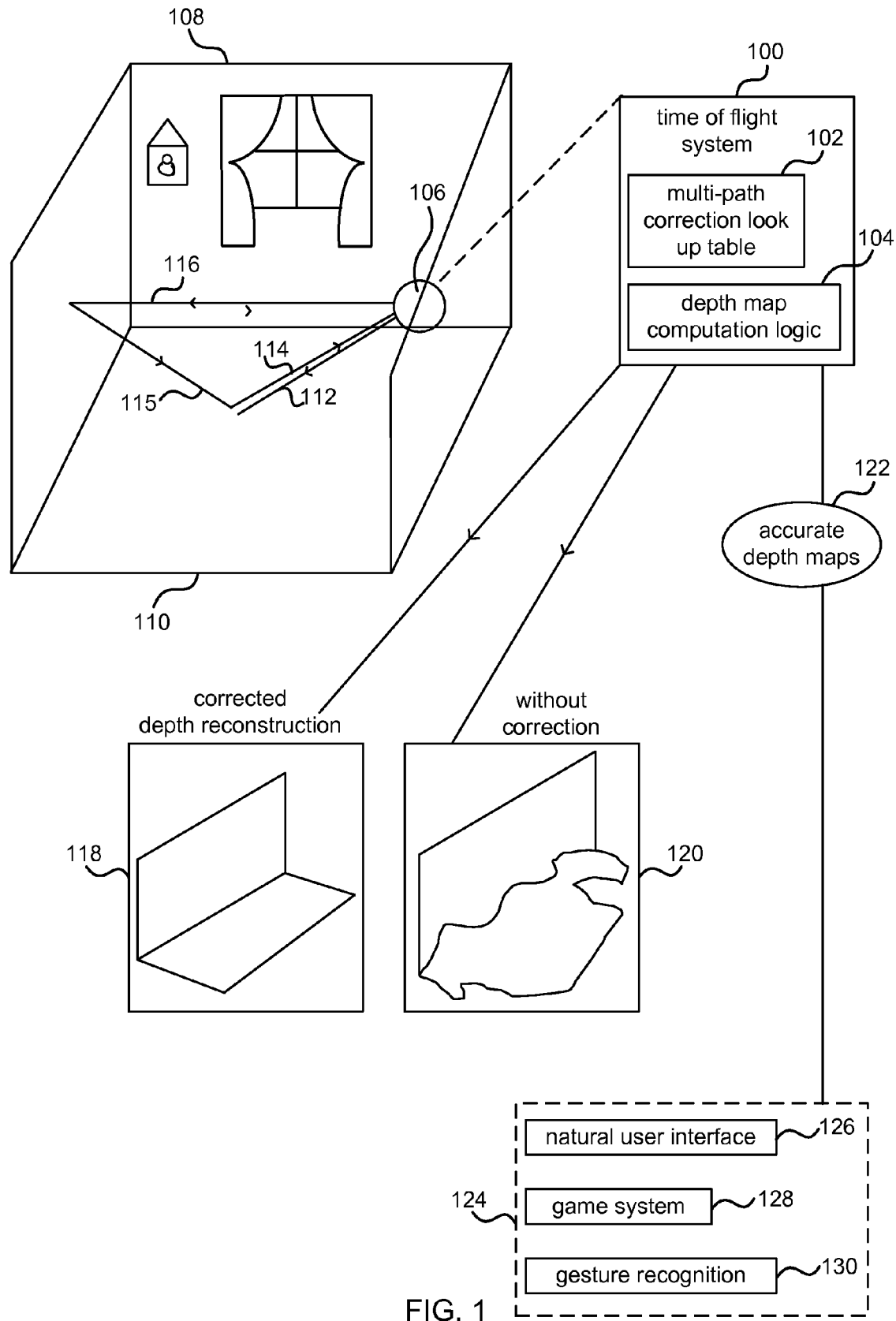
FIG. 1 is a schematic diagram of generating accurate depth maps of an indoor scene using a phase modulation time of flight depth camera.

FIG. 1 is a schematic diagram of generating accurate depth maps of an indoor scene using a phase modulation time of flight depth camera. A time of flight system 106 comprising one or more light sources and a camera is mounted on the wall of a living room 108 having a shiny floor 110. Light emitted by the time of flight sensor may travel along light ray 112 and reflect back off the floor along light ray 114 into the camera. In this case no multipath interference occurs. However light sent out along ray 116 may reflect off the wall and continue along ray 115; this light then reflects off the shiny floor 110 and continues along ray 114 back to the sensor. This is an example of multi-path interference because the signal at the camera comprises data from the direct path (light rays 112 and 114) mixed with data from a secondary path (light rays 116, 115, and 114). The data from the direct path (112, 114) gives an accurate measurement of the depth from the camera to the floor. However, the data from the secondary path (116, 115, and 114) does not because the distance the light ray travels is not an indicator of the distance between the camera and the floor. Many more possible light ray paths may produce components of the signal at the camera. This is described in more detail with reference to FIG. 2 below.

In this example the time of flight system 106 comprises, or is in communication with, a depth map component 100. The depth map component 100 is computer implemented using software and/or hardware. It may be integral with a camera of the time of flight system 106. In other examples the depth map component 100 is implemented at an entity in communication (over any suitable communications network) with the time of flight system 106. For example, a game system 128, a natural user interface 124 apparatus, a gesture recognition 130 apparatus or other apparatus which takes depth maps as input.

The depth map component 100 may be implemented at a computing device in the cloud in some examples. In that case the time of flight system 106 may send measurement data to the time of flight system over a communications network such as the internet or any other wired and/or wireless communications network.

In the example of FIG. 1 the time of flight sensor is static because it is fixed to a wall of a living room. However, it is also possible for the time of flight sensor to be mounted on a moving object such as a person, vehicle, robot or other moving entity.

The depth map component 100 comprises a multi-path correction look up table 102 which is stored in memory at the depth map component 100. The look up table comprises a plurality of indices each having an associated (corrected) depth value and optionally also a corresponding confidence value. The indices may be numerical values such as integers. The depth values may be scalar values in units of distance such as centimeters or other distance units. A depth value may be replaced by an error code in some table entries where no reliable depth value can be measured by the time of flight system. The look up table may be stored as a list, array or using any suitable format.

The depth values in the look up table are pre-computed corrected depth values. A corrected depth value is a depth of a surface from the camera having been calculated by taking into account at least three possible light ray paths between the camera and a surface in the scene. For example the corrected depth values are calculated using a measurement function which takes into account general multipath. A measurement function describes how measurements from a sensor (time of flight camera in this case) relate to the quantity being measured (distances of surfaces from the camera in this case). This gives improved accuracy as compared with previous approaches which have only allowed for two-path multipath. General multipath takes into account a potentially infinite number of possible light ray paths between the camera and a surface in the scene, including where reflection from Lambertian surfaces is involved. More detail about how the corrected depth values are calculated is given below with reference to FIGS. 4 and 5.

The depth map component 108 comprises a depth map computation logic 104. This logic 104 is computer implemented using software and/or hardware. It reads data from the look up table 102 and populates a depth map using the data. As a result accurate depth maps 122 are output from the depth map component 108. By using a look up table to read the data from, the accurate depth maps may be computed in real time, for example, at a frame rate of the camera at the time of flight system 106. This is because the corrected depth values may be computed off-line and so the time taken to compute the corrected depth values does not impact the time taken to compute the depth map. However, the size of the look up table is very large and this also influences computational resources and memory requirements at the depth map component 108. This means that even when using a look up table it is difficult to achieve real time operation. For example, the measurement data from the time of flight system 106 may be six dimensional or higher dimensional. In that case the dimensionality of the look up table is also extremely high.

To facilitate real time operation where look up tables are used a canonical representation may be used to reduce the number of dimensions of the look up table as described in detail in U.S. patent application Ser. No. 13/917,974 filed on 14 Jun. 2013 entitled "Depth map correction using look up tables". This canonical representation and how it may be used in the examples described herein is also summarized later in this document. The examples described below use this type of canonical representation process. However, it is not essential to use the canonical representation. The examples below may be modified to omit the use of the canonical representation where real time operation is not required and/or where parallel processing units are used.

FIG. 1 shows two schematic depth reconstructions of the base of the sitting room wall opposite the time of flight system 106, where the wall joins the floor. Where the depth map component 108 is used a corrected depth reconstruction 118 shows a coherent wall and floor. Where the depth map component 108 is not used a depth reconstruction 120 shows part of the wall coherently but the floor is corrupted, especially near the join between the wall and floor and at the edges of the floor. These are regions where multipath interference is a particular problem. The schematic depth reconstructions 118, 120 are based on empirically derived depth reconstructions from a working time of flight system implementing the methods described herein.

Figure 2:
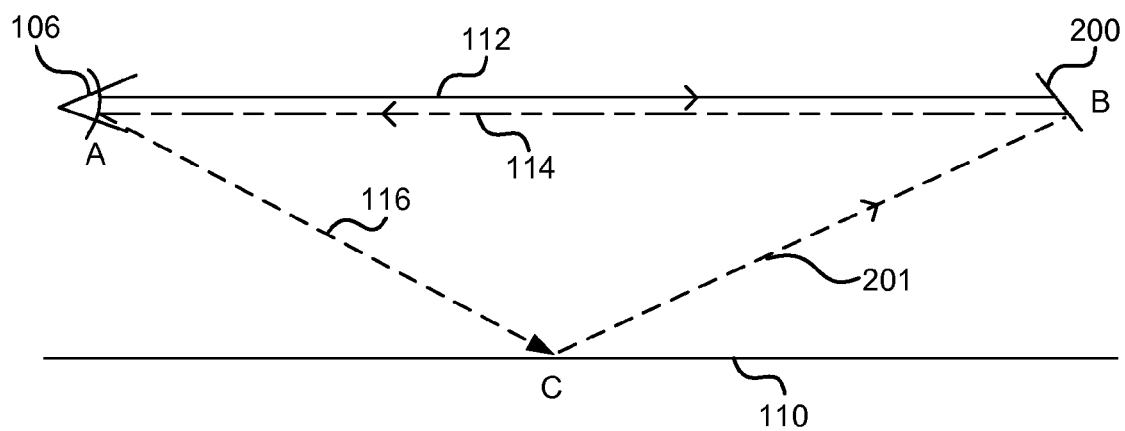
FIG. 2 is a schematic diagram of light rays emitted and received by a time of flight system with and without multipath reflections.
Figure 2:
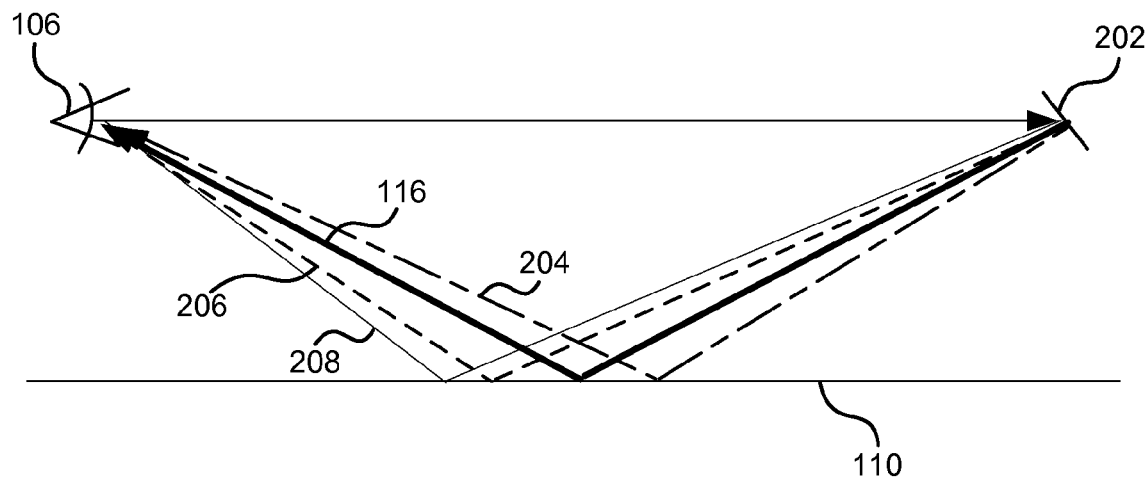

FIG. 2 is a schematic diagram of light rays emitted and received by a time of flight system with and without multipath reflections. In the upper half of FIG. 2 a time of flight system 106 emits light ray 112 which travels parallel with the floor 110, reflects off surface 200 and returns to the time of flight sensor 106 along path 114. The path 112, 114 has a length twice that of the distance of the surface from the time of flight system 106. However, the pixel at the time of flight sensor which receives light ray 114 may also receive light from ray 116 as a result of light ray 116 reflecting off of the floor 110 at point C, continuing on light ray 201 to the surface at point B, and then returning to the surface along light ray 114. A signal at the sensor which gives rise to the pixel is then made up of a component from a first path (112, 114) and a component from a second path (116, 201, 114). Previous correction systems have attempted to correct for interference in this two path case. However, there are a potentially infinite number of possible paths 116, 204, 206, 208, that can give rise to interference as illustrated in the lower half of FIG. 2. Note that only four such floor points are shown in FIG. 2 for clarity. This is an example of Lambertian multipath. An ideal Lambertian surface receives a finite amount of light from a given direction and reflects infinitesimal amounts in all directions. If an infinite number of nearby points (on the floor of the sitting room for example) all reflect infinitesimal amounts into the time of flight camera, then the result can be finite.

Figure 3:
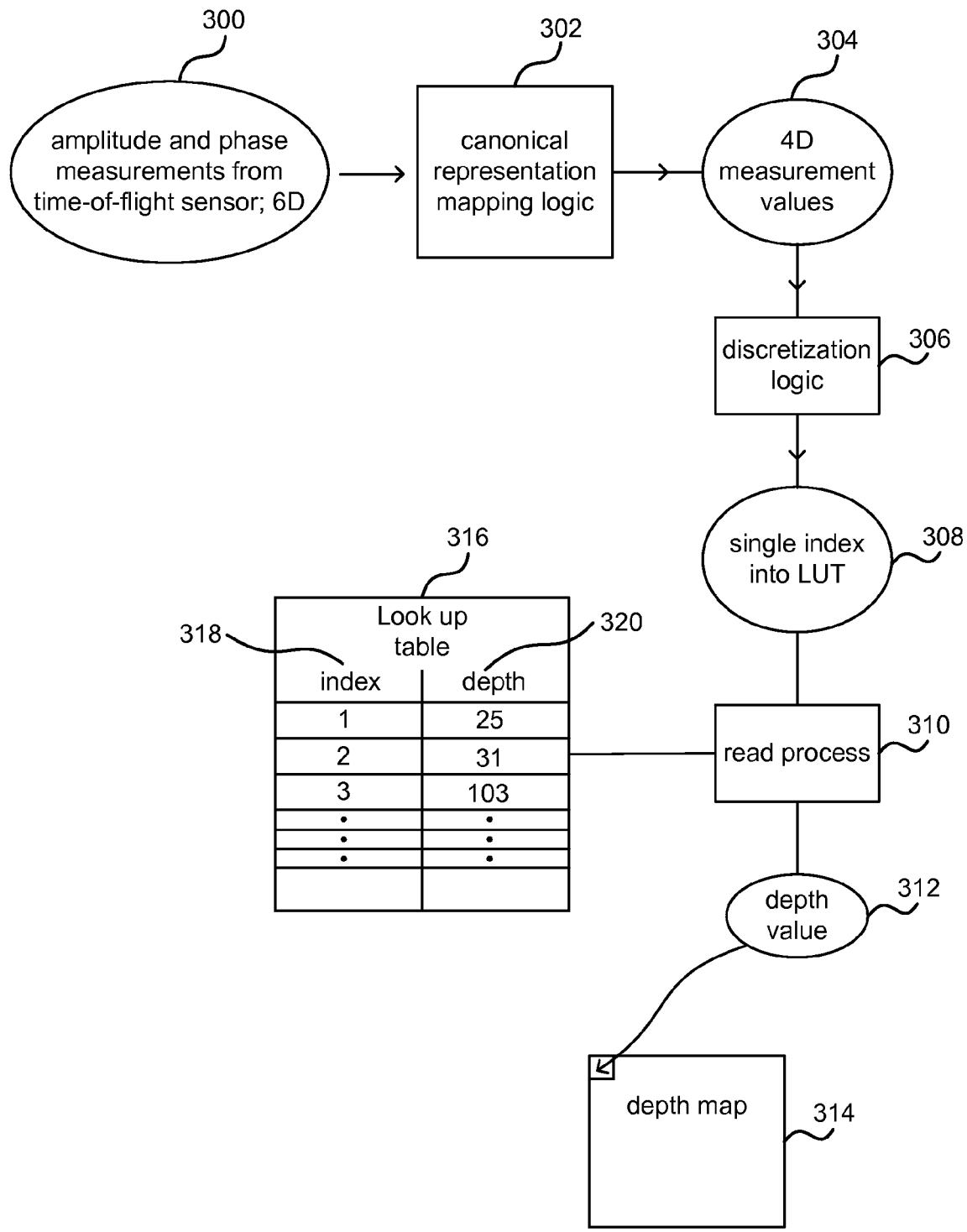
FIG. 3 is a schematic diagram of generating an accurate depth values from amplitude and phase measurements of a time of flight camera.

FIG. 3 is a flow diagram of an example process at depth map component 100. In this example a canonical representation is used to speed up processing as mentioned above. Amplitude and phase measurements are received 300 from a time of flight sensor for a specified pixel (or other image element). These may comprise a continuous amplitude value comprising a real scalar value and a continuous phase value expressed as a complex number for each of a plurality of modulation frequencies. That is, the time of flight sensor may be arranged to emit light at each of a plurality of different modulation frequencies. The measurement data, comprising the amplitude and phase values, has a number of dimensions. For example, where three modulation frequencies are used the number of dimensions may be six as there is an amplitude and a phase value for each modulation frequency.

The measurement values may be processed by a canonical representation mapping logic 302 to calculate a lower dimensional representation of the measurement values (in continuous form). For example, the measurement values may be converted from a 6D form to a 4D form. This is an example only. Other numbers of dimensions may be used, for example, where a different number of modulation frequencies are used and/or where the number of dimensions is reduced by a different amount.

The lower dimensional continuous measurement values 304 are input to a discretization logic 306 which converts the measurement values into discrete values, for example, using a binning process, and calculates a single index 308 into a look up table 316 from the discrete values.

A read process 310 uses the single index to read a depth value from the look up table 316. The look up table 316 comprises a column of indices and a column of associated depth values which have been calculated to take into account generalized multipath interference. For example, where three or more possible light ray paths between the time of flight camera and a surface are taken into account. The depth value 312 that is read from the look up table 316 is stored in a depth map 314 at a location corresponding to the location of the pixel in the image. The process of FIG. 3 repeats for more pixels of the image so that the depth map fills up. The process of FIG. 3 may be implemented in parallel using a parallel computing unit in order to speed up calculation of the depth map 314. However this is not essential. For example, the process of FIG. 3 has been found to take less than 30 milliseconds per frame, for images comprising over 200,000 pixels, using a standard CPU.

The resulting depth map 314 comprises depth values more accurate than previously possible in a very efficient manner. The accurate depth values are read from the look up table without the need for any additional correction step unlike previous approaches.

The process of FIG. 3 may be modified by omitting the canonical representation mapping logic 302. In this case the size of the look up table is increased because the size of the look up table is exponential with respect to the number of dimensions of the measurement values. The memory requirements to store the look up table are thereby increased.

Figure 4:
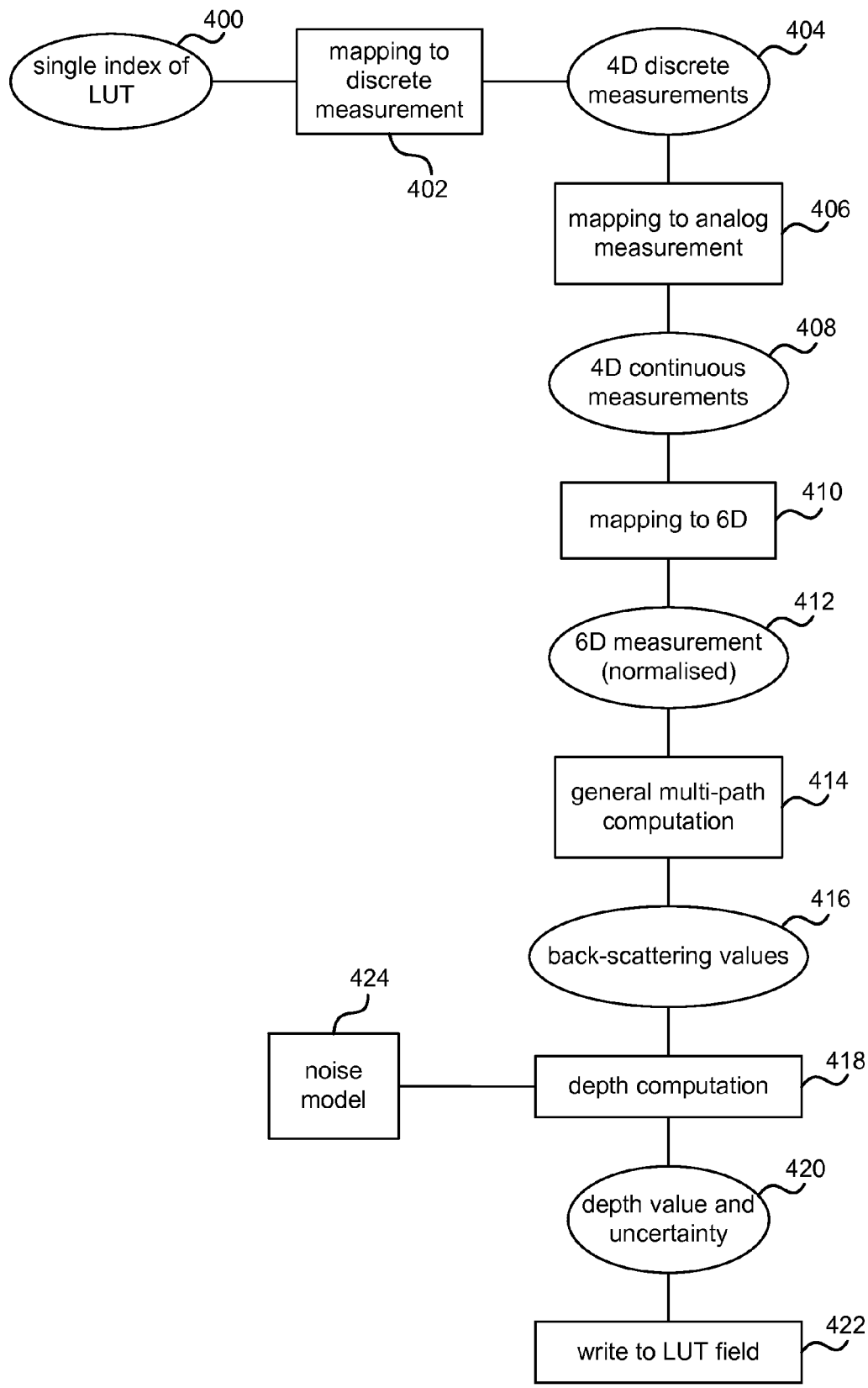
FIG. 4 is a flow diagram of using a general multipath computation to fill values of a look up table for use in a process such as the process of FIG. 3.

FIG. 4 is a flow diagram of a method of calculating and filling data in the look up table of FIG. 3. This process is computer implemented using software and/or hardware. It may be carried out at a look up table construction logic 716 which may be provided at the time of flight system or at another computing device.

A range of indices is selected for the look up table. For example, by specifying a range of indices corresponding to measurement values that in turn correspond to distances that the time of flight camera is to operate in. A plurality of indices within that range are selected. The number of indices selected and the intervals between the corresponding distance values may be chosen depending on factors such as the application domain, the available memory resources, the available computing resources and other factors. The process of FIG. 4 is carried out for each selected index to compute a depth value, and optionally a certainty of the depth value, to write to the look up table. The example of FIG. 4 uses a canonical representation. However, this is not essential as mentioned above.

For a single index 400 (from the selected indices of the range) the index is mapped to 4D discrete measurement values 404 (corresponding to a single pixel or other image element) using a mapping process 402. The 4D discrete measurement values (comprising amplitude and phase values) are mapped to 4D continuous measurements 408 using a mapping to analog measurement component 406. The 4D continuous measurements 408 are mapped to 6D normalized measurements 412 using a mapping to 6D component 410. The 6D normalized measurements 412 are input to a general multipath computation 414 which computes backscattering values 416.

The general multipath computation 414 comprises a measurement function which describes how the 6D measurements relate to a potentially infinite number of light ray paths between the time of flight camera and a surface in the scene being observed. The backscattering values are weights indicating how much contribution each potential light ray path makes to the amplitude and phase values observed at the pixel. The backscattering values may be computed by searching different combinations of possible backscattering values to find a combination which best describes the measurement values. This search may be done using an optimization process or a heuristic process such as a greedy method as described in more detail with reference to FIG. 5.

Once a combination of backscattering values has been found which describes the measurement values well, the process calculates a single depth value to write to the look up table. This is done using depth computation component 418 which may access a noise model 424. The depth computation component 418 may calculate a depth value and optionally a certainty of the depth value. Where no sensible depth value is calculated an error may be returned. The process writes the depth value, or the error, to the lookup table field 422 corresponding to the single index 400. The process may also write the certainty of the depth value to the look up table.

Figure 5:
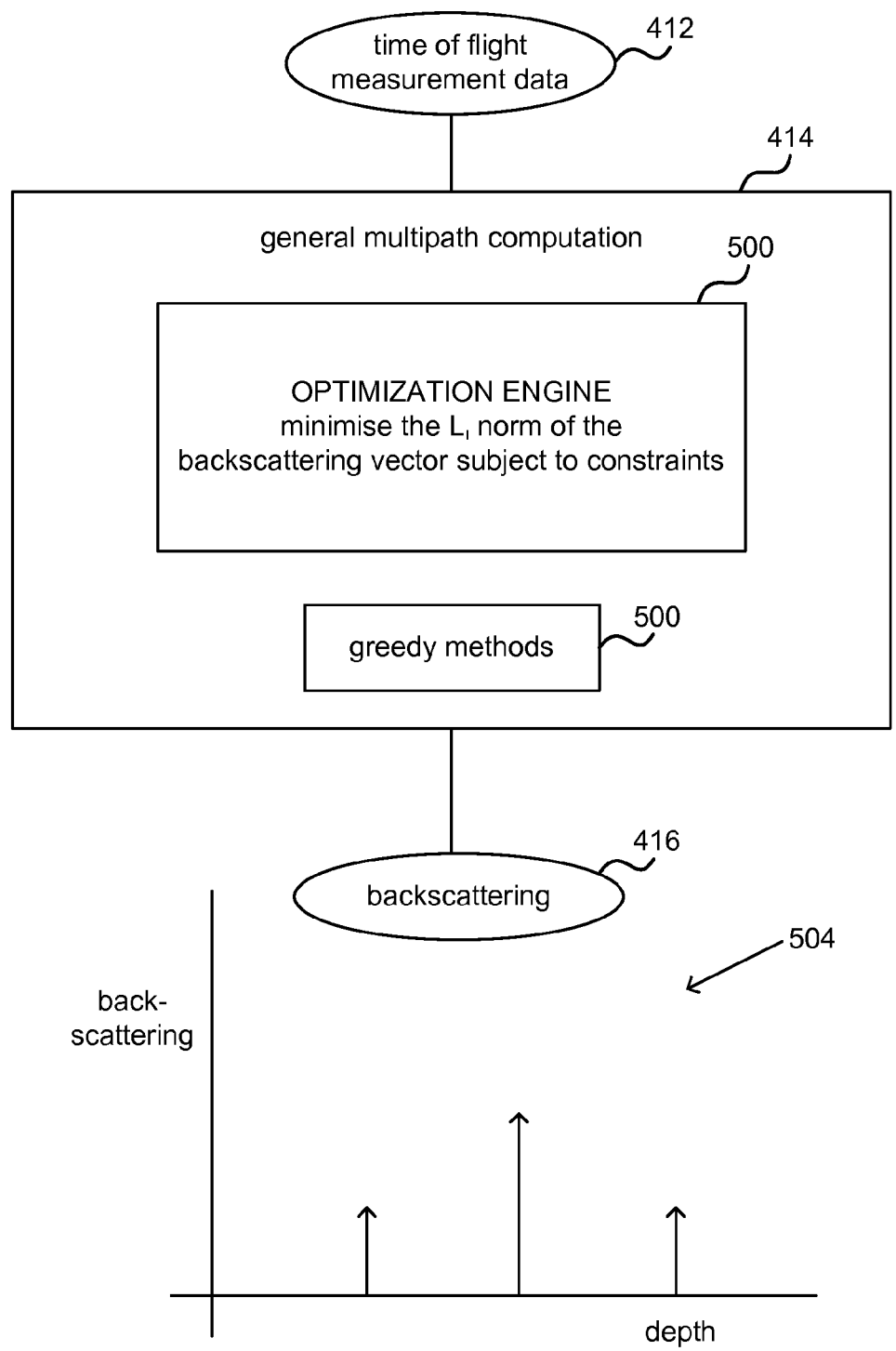
FIG. 5 is a schematic diagram of a general multipath computation component for use in a method such as that of FIG. 4.

FIG. 5 is a schematic diagram of the general multipath computation component 414 of FIG. 4 in more detail. This component calculates a combination of values in a backscattering vector which best describe given measurement values, given that the backscattering vector is related to the measurements via a specified measurement function for time of flight systems. This is not straightforward because there are a potentially infinite number of light ray paths creating multipath interference as described above with reference to FIG. 2, and these light ray paths may have different weights. In order to limit the number of possible combinations to be considered, it is recognized for the first time herein, that the backscattering vector is compressible, that is, it has redundancy. For example, the backscattering vector is sparse in that many of the values in the backscattering vector are zero. This is because many of the possible light ray paths do not contribute to the multipath interference at a given pixel of the time of flight camera.

Previous approaches have not used a measurement function that takes into account general multipath; that is a potentially infinite number of light ray paths between a time of flight system and a surface. Examples of suitable measurement functions are given later in this document.

In some examples, an optimization engine 500 integral with the general multipath computation unit 414 calculates a minimum of an $L_1$ norm of the backscattering vector subject to time of flight measurement data 412 applied to the measurement function and optionally taking into account noise. This gives a backscattering vector 416. An $L_1$ norm is the sum of the absolute values of a vector. Any suitable optimization engine may be used.

In some examples, greedy methods are used to find a best combination of values in the backscattering vector. A greedy method is one which searches for a best value for single ones of the backscattering vector entries in turn and allocates that value without taking into account future entries of the vector which may influence the current allocation. For example, matching pursuit may be used which involves finding the "best matching" projections of multidimensional data onto an over-complete dictionary of functions. A Hilbert space signal is represented as a weighted sum of functions (called atoms) from the dictionary. Given a fixed dictionary, a matching pursuit process first finds an atom from the dictionary that has a biggest inner product with the signal. The process then subtracts from the signal the contribution due to that atom, and repeat the process until the signal is satisfactorily decomposed. In various examples, the signal is the measurement values from the time of flight sensor for a given pixel; the atoms in the dictionary are possible entries of the backscattering vector. The matching pursuit process finds a set of backscattering vector entries that best project onto the measurement vector.

An example of a discrete measurement function which takes into account general multipath is now given.

$$v_k = \sum_{j=1}^{n} x_j e^{2\pi i d_j / \lambda_k}$$

Which may be expressed in words as, measurement values v from a time of flight camera for a given pixel and at a modulation frequency k, are equal to the sum, over a plurality n of distance bins (discrete distance ranges formed by dividing a range of distances from the time of flight camera into bins), of a backscattering vector entry $x_j$ for the bin times a function. This function is a complex exponential of the ratio of the distance of the bin from the time of flight camera $d_j$, to the half-wavelength of light $\lambda_k$ emitted by the time of flight system at the modulation frequency k.

The discrete measurement function may be written in vector matrix form as $v=\Phi x$ where $\Phi$ is a matrix with m columns and n rows and x is a vector with n entries. The vector x is referred to as the backscattering. It has one element for each distance bin. An entry in the backscattering vector is related to the strength of the reflection at the bucketed distance range corresponding to the position of the entry in the vector. The matrix $\Phi$ contains complex numbers as the time of flight camera outputs measurement data comprising complex numbers representing the phase. The complex numbers are converted to real ones by stacking the real part of v on top of the complex part and denoting the 2m-dimsnsional result as v. Doing the same with $\Phi$ leads to a 2m×n real matrix given by $$\Phi_{kj} = \begin{cases} \cos\left(\frac{2\pi d_j}{\lambda_k}\right) & \text{if } k = 1, \ldots, m \\ \sin\left(\frac{2\pi d_j}{\lambda_{k-m}}\right) & \text{if } k = m+1, \ldots, 2m \end{cases}$$

In this way the discrete measurement function may be written as $v=\Phi x$ where the quantities are real.

By recognizing herein that the backscattering vector is non-negative and is compressible (has redundancy) it is possible to find a backscattering vector x which best explains a given measurement value from the time of flight sensor by computing the following minimization:

$$\min_{x \geq 0} \|x\|_1 \text{ subject to } v = \Phi x$$

Which may be expressed in words as, find a backscattering vector with a smallest $L_1$ norm (which is non-negative), where the backscattering vector explains measurement values from the time of flight system according to the measurement function. An $L_1$ norm is a sum of the absolute values of the backscattering vector. This process tries to find the sparsest backscattering vector x which yields the measurement vector v.

The above minimization may be transformed into the following linear program:

$$\min_{x \geq 0} 1^T x \text{ subject to } v = \phi x \text{ (referred to below as equation 1)}$$

Which may be expressed in words as, find the minimum of the inner product of a vector of 1's with the backscattering vector, where the backscatting vector is non-negative and the backscattering vector yields the measurement vector v according to the measurement function.

In some examples noise in the measurement process is taken into account by including a noise term in the measurement function. Optimization, or greedy methods are then used to find the sparsest backscattering vector which yields the measurement values given a measurement function which takes into account noise. For example, the noise may be taken to be Gaussian noise with zero mean and known covariance matrix C. This is one example only, other distributions may be used to represent noise.

In one example noise is taken into account by modifying the $L_1$ optimization to be an $L_1$ optimization with $L_2$ constraints as follows:

$\min_{x \geq 0} \|x\|_1$ subject to $(\Phi x-v)^T C^{-1}(\Phi x-v) \leq \epsilon^2 \|v\|^2$ (referred to as equation 2 herein) where the symbol $\epsilon$ is a parameter controlling the amount of noise. This may be solved with general convex programming solvers.

In another example noise is taken into account by modifying the $L_1$ optimization to be an $L_1$ optimization with $L_1$ constraints as follows:

$\min_{x \leq 0} \|x\|_1$ subject to $\|C^{-1/2}(\Phi x-v)\|_1 \leq \epsilon \|v\|_1$ The above expression may be written as the following linear program:

$\min_{x \leq 0} 1^T x$ subject to $Ax \leq b$

Where $A = Q_{2m} C^{-1/2} \Phi$ and $b = Q_{2m} C^{-1/2} v + \epsilon \|v\|_1 1$
With Q being a particular constant matrix.

The method described above for computing the backscattering is not restricted solely to time of flight depth cameras based on phase modulation. Rather, it can apply to time of flight depth cameras based on other principles. One example is a time of flight depth camera whose measurement is based on emitting pulses of light, which on their return are captured by various shutters. Each shutter will have a characteristic profile, which indicates the duration during which it is open (and hence receiving light); and throughout that duration, the extent to which it is open, which is variable with time. A camera will typically be equipped with several such shutters, each with different profiles.

In such a scenario, it is still possible to formulate the problem of computing the backscattering in the manner described in the preceding paragraphs. It will be appreciated that the matrix $\Phi$ and the vector v will have quite a different form than they do for time of flight cameras based on phase modulation. Nevertheless, the technique for extracting the backscattering x from the measurement v will be the same.

In FIG. 5 the backscattering vector is illustrated in graphical form 504 with depth along the x axis and the magnitude of the backscattering vector entries on the y axis. In this example, only three backscattering vector entries (also referred to as backscattering values) are non-zero and these are shown by the vertical arrows.

As explained above with reference to FIG. 4, a depth computation component 418 calculates a depth value 420 from the backscattering values 416. This is now explained with reference to FIG. 6.

The backscattering values 416 may be represented as a graph 504 in one example. In some examples the depth computation component 418 selects 600 the first non-zero entry of the backscattering vector and uses this to calculate the depth value. That is, the distance bin corresponding to this entry of the backscattering vector is assumed to be the distance range at which there is a surface giving rise to the measured light. It is used to calculate the distance to the surface from the time of flight camera. This gives a depth value 602. The first non-zero entry of the backscattering vector corresponds to the shortest light ray path which contributes to signal at the relevant pixel. This is because the entries in the backscattering vector are ordered in the order of the distance bins.

Figure 6:
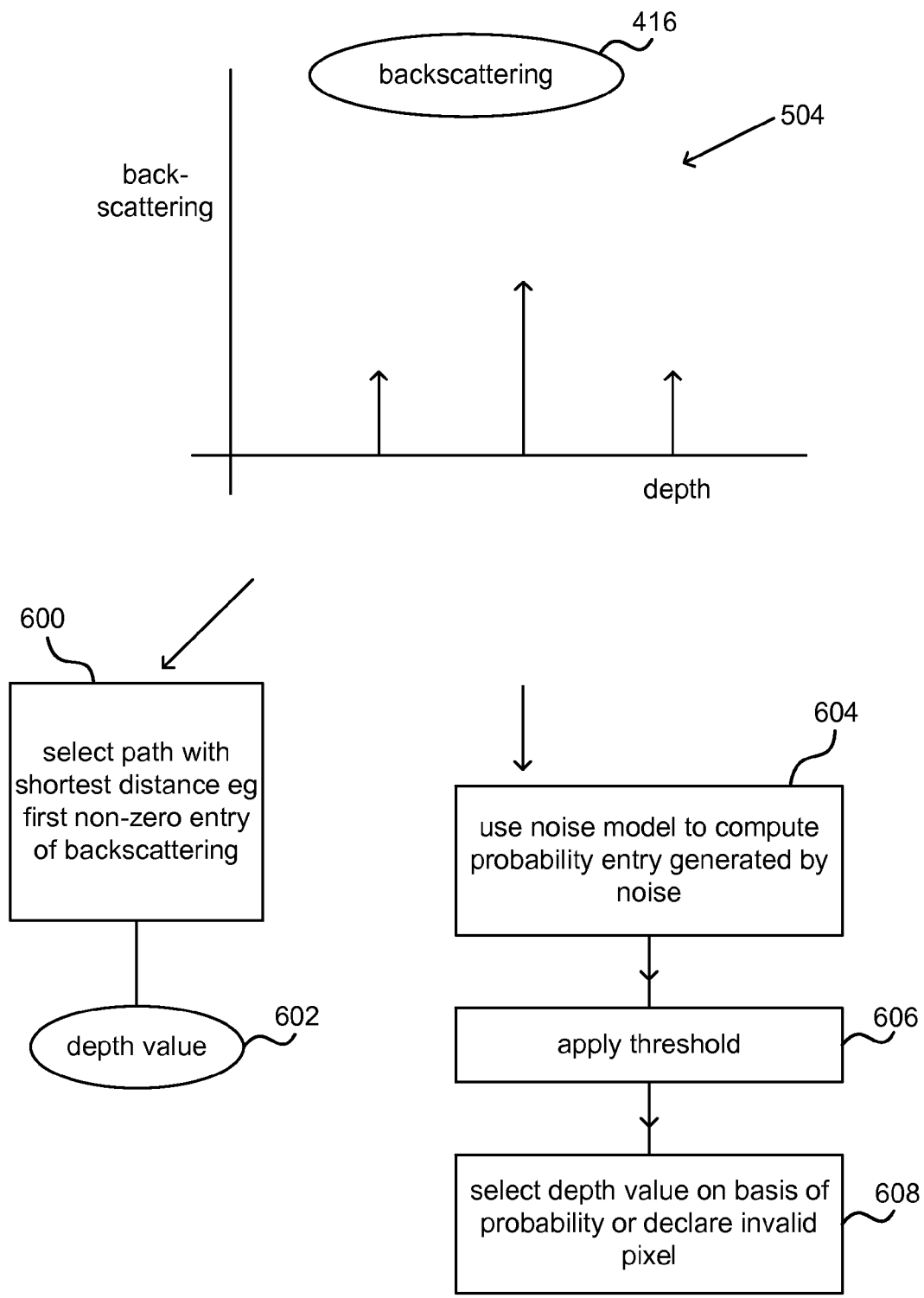
FIG. 6 is a schematic diagram of a backscattering and of processes to compute a depth value from the backscattering.

In some examples the depth computation component 418 takes into account a noise model 424. With reference to FIG. 6 the depth computation component may use a noise model to compute 604 a probability that an entry of the backscattering vector is a result of noise. A threshold may be applied 606 to filter out entries of the backscattering vector which are likely to be due to noise. The depth computation component may select 608 one of the remaining non-zero entries of the backscattering vector on the basis of the probabilities that those entries are due to noise. For example, an entry which is least likely to be due to noise may be selected. In some examples, if all the non-zero entries are likely to be due to noise, an error may be returned. For example, the pixel is declared invalid.

Combinations of the processes of FIG. 6 may be used. For example, finding a backscattering vector entry on the basis of both: its corresponding distance; and on the basis of a probability the vector entry is not due to noise. The distance is from the time of flight system to a surface in a scene.

More detail about an example canonical representation which may be used in the examples described above with reference to FIGS. 3 and 4 is now given.

Define an m×m complex matrix $F_{s,\Delta}$ by $$F_{s,\Delta} = s \cdot \mathrm{diag}(e^{-2\pi i \Delta/\lambda_1}, \ldots, e^{-2\pi i \Delta/\lambda_m})$$

where $\Delta \in \mathbb{R}$; s>0 is any real positive scalar; and diag( ) denotes the diagonal matrix with the specified elements on the diagonal. An example Canonical Transformation applied to the measurement vector v has the form $C(v; s, \Delta) = F_{s,\Delta} v$ This is extended to matrices $\Gamma \in \mathbb{C}^{m \times l}$, as $C(\Gamma; s, \Delta) = F_{s,\Delta} \Gamma$. The following statements may be proved and used to derive a dimension reduction process for use in the methods described above with reference to FIGS. 3 and 4.

Statement 1 Let x* be the solution to the $L_1$ optimization without noise (equation 1 above), and let $x^*_{s,\Gamma}$ be the solution to (equation 1 above) with $C(v; s, \Delta)$ replacing v and $C(\Phi; s, \Delta)$ replacing $\Phi$. Then $x^*_{s,\Delta} = x^*$.

Statement 2 Let x* be the solution to the "noisy" $L_1$ optimization with $L_2$ constraints (equation 2 above) with covariance $C = \sigma^2 I$, and let $x^*_{s,\Delta}$ be the solution to (equation 2 above) with $C(v; s, \Delta)$ replacing v and $C(\Phi; s, \Delta)$ replacing $\Phi$. Then $x^*_{s,\Delta} = x^*$.

The implication of statements 1 and 2 is that it is possible to freely transform both v and $\Phi$ according the Canonical Transformation $C(\cdot; s, \Delta)$ for arbitrary values of s and $\Delta$ and still get the same backscattering solution. The power of these statements derives from the fact that the matrix $\Phi$ does not really change much under the Canonical Transformation. To see this, suppose that $\Phi_\infty$ was a matrix with an infinite number of columns, where the $j^{th}$ column is given as usual by $$\left[ e^{-2\pi i d j/\lambda_1}, \ldots, e^{2\pi i d j/\lambda_m} \right]^T;$$

further, let us take $dl_j = j$ (i.e. spacing of 1 cm), and let j run from $-\infty$ to $\infty$. In this case, it is easy to see that $C(\Phi_\infty; s, \Delta) \propto \Phi_\infty$ for any $\Delta \in \mathbb{N}$.

What this means is that, if solving the optimizations described herein using the infinite-size matrix $\Phi_\infty$, it is possible to transform v according to $C(v; s, \Delta)$ and leave $\Phi_\infty$ alone. This is very powerful, because it allows to transform v into a particular Canonical Representation which enables dimension reduction, with no change to $\Phi$. In practice, of course, $\Phi$ does not have an infinite number of columns. This is gotten around through simple means, to be described shortly.

Before going on, note that the Canonical Transformation is not used in this way if the noise covariance matrix is not proportional to the identity, nor for the optimization of $L_1$ with $L_1$ constraints. Nevertheless, due to the fact that the "centre" of these constraints is preserved by the Canonical Transformation (where the centre is $\{x: \Phi x=v\}$), the transformed constraints are still sensible, even if they are slightly different.

A Canonical Representation is derived from the Canonical Transformation by a particular choice of s and $\Delta$. Let $k \in \{1, \ldots, m\}$ be a particular frequency index; then v's Canonical Representation, $\rho^{(k)}(v)$ is given by $$\rho^{(k)}(v) \equiv C(v; s=\|v\|^{-1}, \Delta=\lambda_k(\angle v_k/2\pi))$$

where $\angle v_k$ denotes the phase of $v_k$, taken to lie in [0,2m). It is easy to see that $\rho^{(k)}$ has the following properties:

Property of the Canonical Representation: The $k^{th}$ element of $\rho^{(k)}(v)$ is real, i.e. has 0 phase. Furthermore, the $k^{th}$ element of $\rho^{(k)}(v)$ may be found from the other elements of $\rho^{(k)}(v)$ by $\rho^{(k)}(v) = (1 - \Sigma_{k' \neq k} |\rho_{k'}^{(k)}(v)|^2)^{1/2}$.

In other words, in the Canonical Representation, one of the elements is redundant, in that it is completely determined by the other elements. Hence, this element can be removed without losing information. Of course, the component is complex, meaning that we have removed two real dimensions, hence enabling the promised dimension reduction from 2m to 2m−2.

A look up table can be built on the remaining 2m−2 dimensions, by discretizing over these dimensions. Suppose that the range of potential distances is $D_{min}$ to $D_{max}$; for example these take on values of 20 cm and 450 cm respectively. However, other values may be used. Note that the minimal value that $\Delta$ can take on is 0, while the maximal value is $\lambda_k$ the wavelength of the emitted light at the modulation frequency k. Thus, after the Canonical Transformation the potential distances can now fall between $D_{min}$-$\lambda_k$ and $D_{max}$. Thus, the matrix $\Phi$ is now enlarged to have columns corresponding to distances between $D_{min}$-$\lambda_k$ and $D_{max}$.

In order to choose a value for k in the above canonical representation one option is to keep the above range as small as possible, and hence to choose the k corresponding to the smallest half-wavelength $\lambda_k$. However, other values of k may be used.

In various examples, a method at the depth map computation logic 104 comprises: receiving, at a processor, time of flight depth camera amplitude and phase measurements depicting surfaces in a scene, the measurements being received at a frame rate of the time of flight camera; computing indices of a look up table from the measurements; using the indices to read corrected depth values from the look up table, the corrected values being depths of surfaces from the camera having been calculated so as to reduce the effects of general multipath interference; and using the corrected depth values to form a depth map in a time at or below the frame rate of the time of flight camera.

Figure 7:
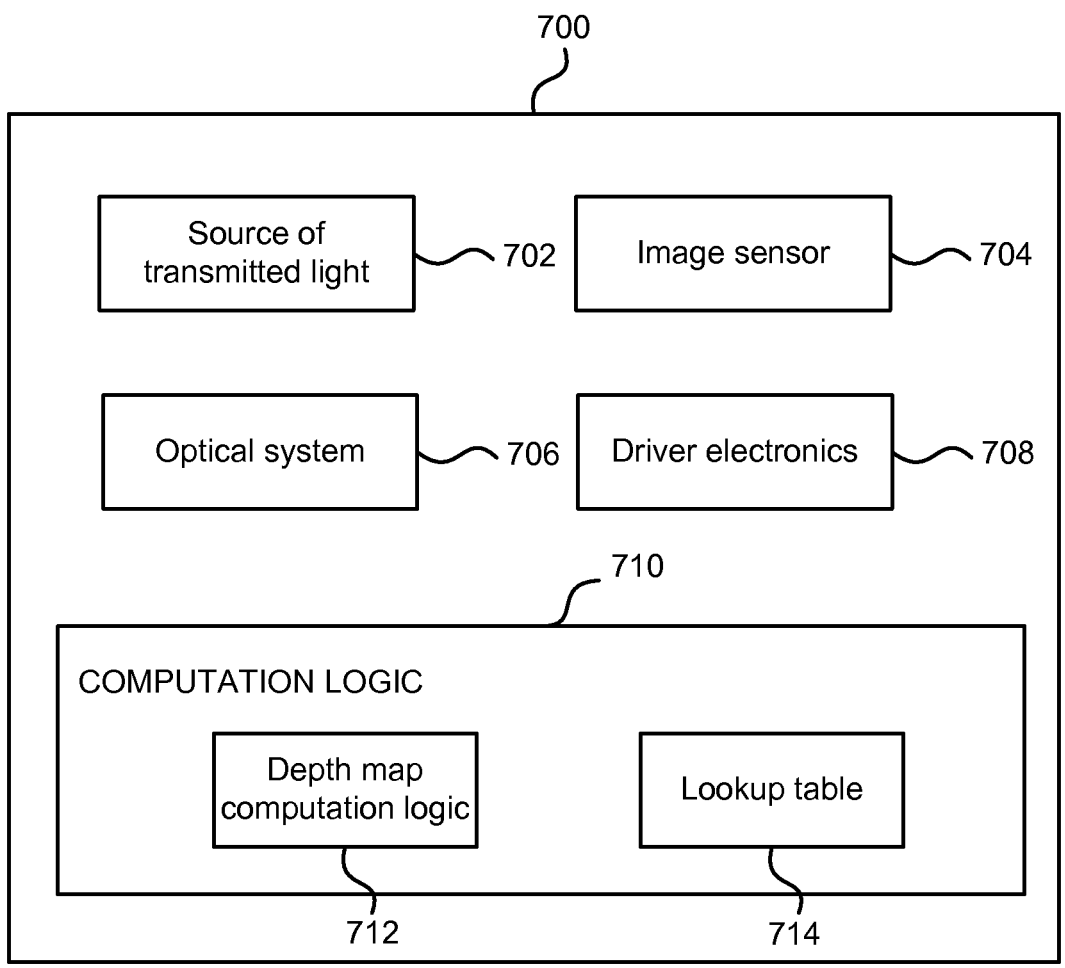
FIG. 7 is a schematic diagram of an example phase modulation time of flight depth camera.

FIG. 7 is a schematic diagram of a phase modulation time of flight depth camera. A phase modulation time of flight depth camera 700 may comprise a source of transmitted light 702. In an example the source of transmitted light is an incoherent light source. In another example the source of transmitted light is a coherent light source. An example of an appropriate light source is a near infra-red laser or a light emitting diode (LED) however another appropriate light source may be used. The transmitted light may be modulated at one or more modulation frequencies. In an example the modulation frequencies may be RF frequencies in the range kHz-GHz, for example the modulation frequencies may be in the MHz range.

A phase modulation time of flight depth camera may further comprise an image sensor 704 that receives light reflected from objects within a scene. The image sensor 704 may comprise a CCD sensor, a CMOS sensor, for example a Photonic Mixer Device (PMD) sensor or other appropriate sensor which may be arranged to detect light reflected from surfaces of objects, people or other entities within the camera range.

The camera may further comprise an optical system 706 that is arranged to gather and focus light (ambient light and light emitted by the source 702 and reflected) from the environment on to the image sensor 704. In an example the optical system may comprise an optical band pass filter, which may enable only light of the same wavelength as the light source to be received by the sensor. The use of an optical band pass filter may help to suppress background light. The camera may also comprise driver electronics 708 which control both the light source and an image sensor, for example, to enable highly accurate phase difference measurements to be made.

In one example the camera may comprise computation logic 710. In an embodiment computation logic may be arranged to execute the methods described herein with reference to one or more of FIG. 4, FIG. 5 and FIG. 6. In an example, the described method of computing the look up table values may be executed as a one-time process during camera testing and calibration.

Computation logic may further comprise integrated depth map computation logic 712, optional look up table construction logic 716 and a lookup table 714 stored at a memory. In an example depth map computation logic 712 may be arranged to estimate a distance of an object from the difference in phase between light transmitted from the light source and the light received at the receiver. In various examples the received light has undergone at least two path reflection e.g. multipath reflection.

The lookup table 714 may store an association between measured amplitudes and phases (converted into single valued indexes) and corrected depth values as described above.

In an example look up table construction logic 716 may be used to populate lookup table 714 as described above with reference to FIG. 4. However, it is not essential to implement the look up table construction logic 716 at the camera.

In other examples, the computation logic 710 may be located external to the camera on another device e.g. a game system, personal computer, mobile device or other computing device.

Alternatively, or in addition, the functionality of one or more of the components of the computation logic 710 may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 8:
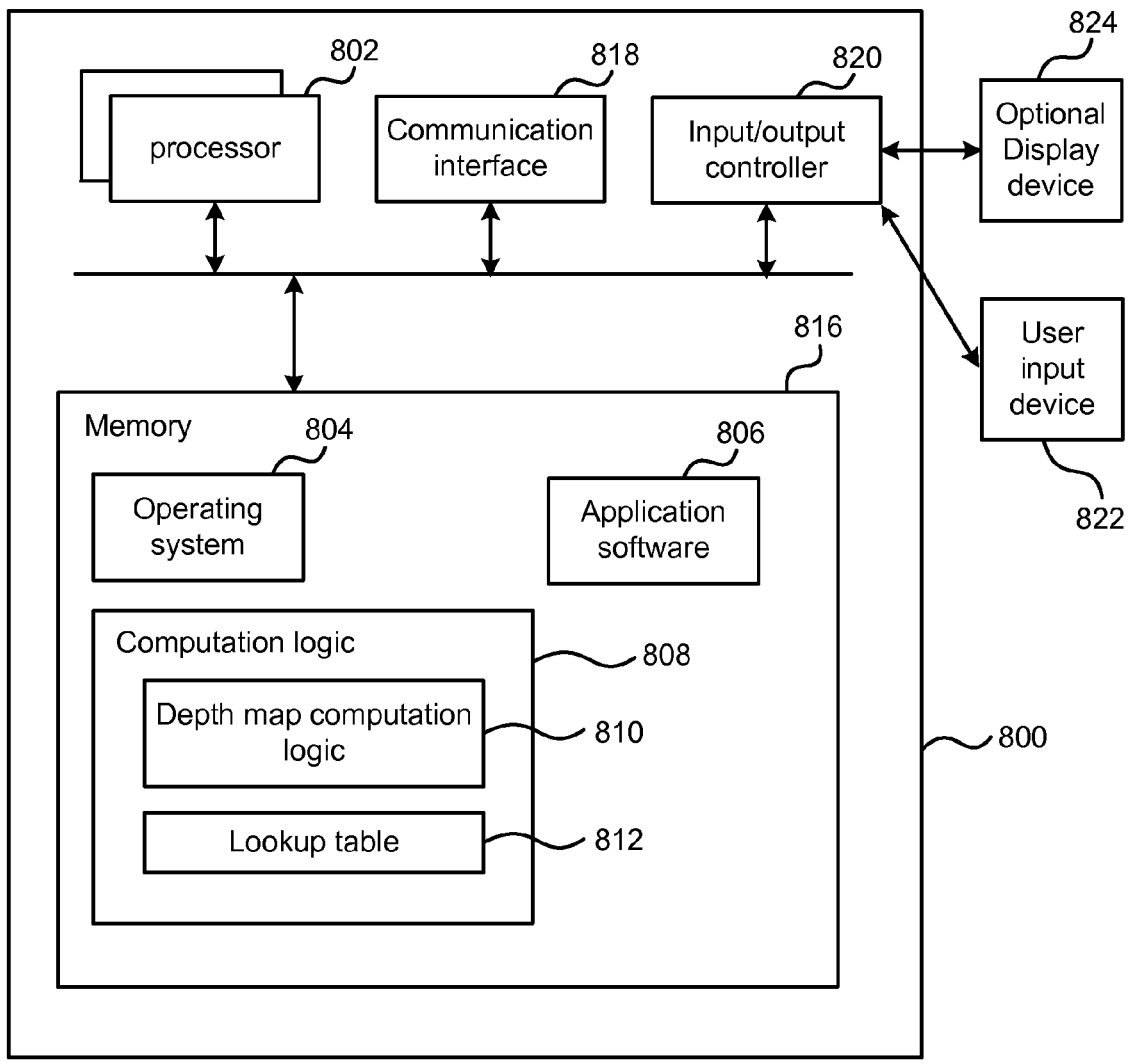
FIG. 8 illustrates an exemplary computing-based device in which embodiments of accurate depth computation taking into account three or more time of flight camera ray paths per pixel is implemented.

FIG. 8 illustrates various components of an exemplary computing-based device 800 which may be implemented as any form of a computing and/or electronic device, and in which embodiments of any of the methods described herein may be implemented.

Computing-based device 800 comprises one or more processors 802 which may be microprocessors, controllers or any other suitable type of processors for processing computer executable instructions to control the operation of the device in order to do any of: compute general multipath corrected depth values and store those values in a look up table, compute an accurate depth measurement from empirical time of flight measurement values. In some examples, for example where a system on a chip architecture is used, the processors 802 may include one or more fixed function blocks (also referred to as accelerators) which implement a part of the method of depth computation or look up table creation using hardware (rather than software or firmware). For example, computation logic for computing depth maps may be implemented in hardware. Platform software comprising an operating system 804 or any other suitable platform software may be provided at the computing-based device to enable application software 806 to be executed on the device. In an example computing-based device 800 may further comprise computation logic 808. Computation logic 808 may further comprise integrated depth map computation logic 810, and a stored depth correction lookup table 812 which may be arranged to operate as described above with reference to FIG. 3. In an example depth map computation logic 810 may be arranged to estimate a distance of an object from the difference in phase between light transmitted from the light source and the light received at the receiver. In various examples the received light has undergone general multipath reflection involving two or more light ray paths in addition to a light ray path with no interference. In some examples the computation logic 808 is arranged to compute accurate depth values for filling the look up table as described above with reference to FIG. 4.

The computer executable instructions may be provided using any computer-readable media that is accessible by computing based device 800. Computer-readable media may include, for example, computer storage media such as memory 816 and communications media. Computer storage media, such as memory 816, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 816) is shown within the computing-based device 800 it will be appreciated that the storage may be distributed or located remotely and accessed via a network or other communication link (e.g. using communication interface 808).

The computing-based device 800 also comprises an input/output controller 820 arranged to output display information to a display device 824 which may be separate from or integral to the computing-based device 800. The display information may provide a graphical user interface. The input/output controller 820 is also arranged to receive and process input from one or more devices, such as a user input device 822 (e.g. a mouse, keyboard, camera, microphone or other sensor). In some examples the user input device 822 may detect voice input, user gestures or other user actions and may provide a natural user interface (NUI). This user input may be used to generate depth maps as described above. In an embodiment the display device 824 may also act as the user input device 822 if it is a touch sensitive display device. The input/output controller 820 may also output data to devices other than the display device, e.g. a locally connected printing device (not shown in FIG. 8).

Any of the input/output controller 820, display device 824 and the user input device 822 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
   receiving, at a processor, time of flight depth camera amplitude and phase measurements depicting surfaces in a scene;
   computing, via the processor, an index of a look up table from the measurements;
   using the index to read, via the processor, a corrected depth value from the look up table, the corrected value being a depth of a surface from the camera having been calculated by taking into account at least three possible light ray paths between the camera and a surface in the scene and searching for values of a backscattering vector, wherein the backscattering vector values comprise weights indicating how much contribution is made to the amplitude and phase values observed at a pixel from light associated with a plurality of different distance bins, and the distance bins comprise a distance range from the time of flight camera divided into intervals.

2. A method as claimed in claim 1 comprising repeating the process of claim 1 for a plurality of pixels of an image captured by the time of flight depth camera to obtain a multipath corrected depth map.

3. A method as claimed in claim 2 wherein the depth value that is read from the lookup table is stored in a depth map at a location corresponding to the location of the pixel in the image.

4. A method as claimed in claim 1 wherein the look up table has a number of dimensions which is lower than a number of dimensions of the received time of flight depth camera amplitude and phase measurements.

5. A method as claimed in claim 1 comprising computing the index from the measurements at least by allocating the measurements to one or more of a plurality of bins, where a bin is a specified range of values.

6. A method as claimed in claim 1 comprising computing the index from the measurements by mapping the measurements to a lower dimensional form.

7. A method as claimed in claim 1, the corrected value having been calculated by searching for values of the backscattering vector which sum to a smallest absolute amount.

8. A method as claimed in claim 1, the corrected value having been calculated by taking into account noise in the amplitude and phase values.

9. A method as claimed in claim 1, wherein the search is carried out using a greedy algorithm which allocates a value of the backscattering vector without taking into account future entries of the vector which may influence the allocated value.

10. A method as claimed in claim 1, wherein the search is carried out using an optimization engine.

11. A method as claimed in claim 1, the corrected value having been calculated by selecting one of the values of the backscattering vector on the basis of a noise model.

12. A method as claimed in claim 1, the corrected value having been calculated by selecting one of the values of the backscattering vector on the basis of the position of the values in the backscattering vector.

13. A method as claimed in claim 1 at least partially carried out using hardware logic.

14. A depth map computation apparatus comprising:
   a processor arranged to receive time of flight depth camera amplitude and phase measurements depicting a surface in a scene;
   a depth map computation logic configured to compute via the processor an index of a look up table from the measurements;
   the depth map computation logic configured to read via the processor a corrected depth value from the look up table using the index, the corrected value being a depth of the surface from the camera having been calculated by taking into account at least three possible light ray paths between the camera and the surface in the scene and searching for values of a backscattering vector, wherein the backscattering vector values comprise weights indicating how much contribution is made to the amplitude and phase values observed at a pixel from light associated with a plurality of different distance bins, and the distance bins comprise a distance range from the time of flight camera divided into intervals.

15. An apparatus as claimed in claim 14 comprising a memory storing the look up table.

16. An apparatus as claimed in claim 14 the depth map computation logic being at least partially implemented using hardware logic selected from any one or more of: a field-programmable gate array, a program-specific integrated circuit, a program-specific standard product, a system-on-a-chip, a complex programmable logic device, a graphics processing unit.

17. A method comprising:
receiving, at a processor, time of flight depth camera amplitude and phase measurements depicting surfaces in a scene, the measurements being received at a frame rate of the time of flight camera;
computing, via the processor, indices of a look up table from the measurements;
using the indices to read, via the processor, corrected depth values from the look up table, the corrected values being depths of surfaces from the camera having been calculated so as to reduce the effects of general multipath interference by taking into account at least three possible light ray paths between the camera and a surface in the scene and searching for values of a backscattering vector; and
using the corrected depth values to form, via the processor, a depth map in a time at or below the frame rate of the time of flight camera, wherein the backscattering vector values comprise weights indicating how much contribution is made to the amplitude and phase values observed at a pixel from light associated with a plurality of different distance bins, and the distance bins comprise a distance range from the time of flight camera divided into intervals.

18. A method as claimed in claim 17 wherein general multipath interference comprises interference from two or more light ray paths in addition to a light ray path having no interference.

19. A method as claimed in claim 17 wherein the depth map is formed at a frame rate of a time of flight camera.

* * * * *